(12) United States Patent
Yang et al.

(10) Patent No.: US 10,928,217 B2
(45) Date of Patent: Feb. 23, 2021

(54) METHOD AND APPARATUS FOR DISPLAYING NAVIGATION ROUTES AND STORAGE MEDIUM

(71) Applicant: Baidu Online Network Technology (Beijing) Co., Ltd., Beijing (CN)

(72) Inventors: Ge Yang, Beijing (CN); Xin Zhang, Beijing (CN); Chen Chen, Beijing (CN); Junfei Bu, Beijing (CN); Yang Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 168 days.

(21) Appl. No.: 16/146,187

(22) Filed: Sep. 28, 2018

(65) Prior Publication Data

US 2019/0033092 A1      Jan. 31, 2019

Related U.S. Application Data

(63) Continuation of application No. PCT/CN2016/096107, filed on Aug. 19, 2016.

(30) Foreign Application Priority Data

Mar. 31, 2016  (CN) .......................... 201610197251.2

(51) Int. Cl.
  *G01C 21/36*  (2006.01)
  *G01C 21/34*  (2006.01)

(52) U.S. Cl.
  CPC ......... *G01C 21/3676* (2013.01); *G01C 21/34* (2013.01); *G01C 21/3415* (2013.01);
  (Continued)

(58) Field of Classification Search
  CPC .... G01C 21/34; G01C 21/36; G01C 21/3415; G01C 21/3676; G01C 21/3614; G01C 21/3673; G01C 21/3694
  (Continued)

(56) References Cited

U.S. PATENT DOCUMENTS 6,889,134 B2 *  5/2005  Nakane .................. G01C 21/32
                                                      701/533
7,133,054 B2 * 11/2006  Aguera Y Arcas .... G01C 21/36
                                                      345/666

(Continued)

FOREIGN PATENT DOCUMENTS

CN    102095426 A    6/2011
CN    102230804 A    11/2011
(Continued)

OTHER PUBLICATIONS

Route-planning based on a passenger condition for self-driving vehicles; Hironori Hiraishi; 2017 IEEE 16th International Conference on Cognitive Informatics & Cognitive Computing (ICCI*CC); IEEE Conference Paper (Year: 2017).*

(Continued)

*Primary Examiner* — Cuong H Nguyen
(74) *Attorney, Agent, or Firm* — Knobbe, Martens, Olson & Bear, LLP

(57) ABSTRACT

Embodiments of the present disclosure disclose a method and apparatus for displaying navigation routes. The method includes: receiving, from a navigation server, at least two navigation routes from a navigation starting point to a navigation destination; determining a current navigation route from the navigation routes according to selection by a user, and assigning remaining routes as backup navigation routes; and displaying, in a navigation map, the current navigation route in a first mode and displaying the backup navigation routes in a second mode different from the first
(Continued)

mode. In the embodiments of the present disclosure, by using the technical solution, the user may clearly and conveniently distinguish the current navigation route from the backup navigation routes, thereby improving the user experience.

15 Claims, 8 Drawing Sheets

(52) U.S. Cl.
CPC ..... *G01C 21/3614* (2013.01); *G01C 21/3694* (2013.01); *G01C 21/3673* (2013.01)

(58) Field of Classification Search
USPC .......................... 701/533, 411, 413–414, 416
See application file for complete search history.

(56) References Cited

U.S. PATENT DOCUMENTS

| | | | | |
|---|---|---|---|---|
| 7,375,732 | B2* | 5/2008 | Aguera Y Arcas | G01C 21/36 345/666 |
| 7,474,959 | B2* | 1/2009 | Singh | G01C 21/34 340/463 |
| 7,558,670 | B2* | 7/2009 | Nagasawa | G05D 1/0223 340/995.21 |
| 7,818,121 | B2* | 10/2010 | Uyeki | G08G 1/096844 701/413 |
| 8,010,279 | B2* | 8/2011 | Kobuya | G01C 21/00 701/438 |
| 8,386,165 | B2* | 2/2013 | Kobuya | H04L 67/327 701/409 |
| 8,467,954 | B2* | 6/2013 | Kobuya | G06F 16/9537 701/400 |
| 8,577,604 | B1* | 11/2013 | Ogale | G01C 21/3602 701/450 |
| 8,700,327 | B2 | 4/2014 | Cabral | |
| 8,725,341 | B2* | 5/2014 | Ogasawara | G01C 21/3605 701/23 |
| 8,924,049 | B2* | 12/2014 | Kumar | B61L 27/0027 701/19 |
| 8,972,186 | B2* | 3/2015 | Kobuya | G09B 29/008 701/533 |
| 2002/0035430 | A1 | 3/2002 | Kenichiro et al. | |
| 2005/0222764 | A1* | 10/2005 | Uyeki | G01C 21/3415 701/414 |
| 2007/0225902 | A1* | 9/2007 | Gretton | G08G 1/096861 701/533 |
| 2007/0244635 | A1 | 10/2007 | Akinori et al. | |
| 2007/0290839 | A1* | 12/2007 | Uyeki | G01C 21/3415 340/539.13 |
| 2009/0005962 | A1 | 1/2009 | Shinto et al. | |
| 2010/0121565 | A1* | 5/2010 | Uyeki | G08G 1/096844 701/413 |
| 2010/0324810 | A1* | 12/2010 | Uyeki | G01C 21/3415 701/414 |
| 2011/0046872 | A1* | 2/2011 | Uyeki | G01C 21/3415 701/527 |
| 2011/0160989 | A1* | 6/2011 | Uyeki | G01C 21/3415 701/119 |
| 2011/0264366 | A1* | 10/2011 | Cabral | G01C 21/3415 701/533 |
| 2011/0264371 | A1* | 10/2011 | Uyeki | G01C 21/3694 701/414 |
| 2011/0301830 | A1 | 12/2011 | Tate | |
| 2013/0103313 | A1* | 4/2013 | Moore | G01C 21/3673 701/533 |
| 2016/0356603 | A1* | 12/2016 | Hajj | G01C 21/20 |
| 2016/0356613 | A1* | 12/2016 | Hajj | G01C 21/3667 |
| 2016/0358471 | A1* | 12/2016 | Hajj | G01C 21/3423 |

FOREIGN PATENT DOCUMENTS

| | | |
|---|---|---|
| CN | 102967318 A | 3/2013 |
| CN | 104596524 A | 5/2015 |
| CN | 104596529 A | 5/2015 |
| EP | 1191307 A2 | 3/2002 |
| EP | 1847805 A2 | 10/2007 |
| EP | 1975560 A1 | 10/2008 |
| JP | 2000-065591 A | 3/2000 |
| JP | 2000-304562 A | 11/2000 |
| JP | 2001-227965 A | 8/2001 |
| JP | 2004-233230 A | 8/2004 |
| JP | 2009-198193 A | 9/2009 |
| JP | 2009-236520 A | 10/2009 |
| JP | 2013083507 A | 5/2013 |
| JP | 2015148817 A | 8/2015 |
| WO | 2012167148 A2 | 6/2012 |

OTHER PUBLICATIONS

Study of cognitive route search technique for self-driving vehicles; Hironori Hiraishi ; Fumio Mizoguchi; 2017 IEEE 16th International Conference on Cognitive Informatics & Cognitive Computing (ICCI*CC); IEEE Conference Paper. (Year: 2017).*
Detection of unwanted traffic congestion based on existing surveillance system using in freeway via a CNN-architecture trafficnet Ping Wang ; Li Li ; Yinli Jin ; Guiping Wang; 2018 13th IEEE Conference on Industrial Electronics and Applications (ICIEA); IEEE Conference Paper. (Year: 2018).*
A dynamic road incident information delivery strategy to reduce urban traffic congestion; Liang Qi ; Mengchu Zhou ; Wenjing Luan; IEEE/CAA Journal of Automatica Sinica; vol. 5, Issue: 5; IEEE Journal Article. (Year: 2018).*
International Search Report dated Dec. 26, 2016 for International Application No. PCT/CN2016/096107, 8 pages.
Written Opinion of the International Searching Authority dated Dec. 26, 2016 for International Application No. PCT/CN2016/096107, 5 pages.
Google Maps, 5 Awesome Tips (you probably did not know!).

* cited by examiner

METHOD AND APPARATUS FOR DISPLAYING NAVIGATION ROUTES AND STORAGE MEDIUM

CROSS-REFERENCE TO RELATED APPLICATIONS

This application is a continuation of International Application PCT/CN2016/096107, with an international filing date of Aug. 19, 2016, which claims priority to Chinese Patent Application no. 201610197251.2, filed with the China National Intellectual Property Administration (CNIPA) on Mar. 31, 2016, the contents of which are incorporated herein by reference in their entirety.

TECHNICAL FIELD

Embodiments of the present disclosure relate to the navigation technology, and specifically to a method and apparatus for displaying navigation routes.

BACKGROUND

As GPS (Global Positioning System) becomes more popular, more and more consumers instantly acquire route planning information when driving or walking, through intelligent terminals carried by them. The basic flow of the existing route navigation is as follows: a user opens a navigation client software installed on the intelligent terminal, inputs an starting point position and a destination position, and sends the positions to a corresponding navigation server, the navigation server generates a navigation route according to starting point and destination position information and returns it to the client software, and the client software directs the driving or walking of the user according to the navigation route.

With the development of the technology and increasing requirements for navigation products, the traditional navigation products cannot meet the increasing demands for individualized and convenient navigation.

SUMMARY

Embodiments of the present disclosure provide a method and apparatus for displaying navigation routes, to optimize the existing route navigation techniques to meet the growing demands for individualized and convenient navigation.

In a first aspect, the embodiments of the present disclosure provide a method for displaying navigation routes, the method including:

receiving, from a navigation server, at least two navigation routes from a navigation starting point to a navigation destination;

determining a current navigation route from the navigation routes according to selection by a user, and assigning remaining routes as backup navigation routes; and displaying, in a navigation map, the current navigation route in a first mode and displaying the backup navigation routes in a second mode different from the first mode.

In a second aspect, the embodiments of the present disclosure provide an apparatus for displaying navigation routes, including:

a navigation route receiving module, configured to receive, from a navigation server, at least two navigation routes from a navigation starting point to a navigation destination;

a navigation route determining module, configured to determine a current navigation route from the navigation routes according to selection by a user, and assign remaining routes as backup navigation routes; and a first route displaying module, configured to display, in a navigation map, the current navigation route in a first mode and display the backup navigation routes in a second mode different from the first mode.

In a third aspect, the embodiments of the present disclosure further provide a storage medium storing computer executable instructions, wherein the computer executable instructions, when executed by a computer processor, perform a method for displaying navigation routes, including:

receiving, from a navigation server, at least two navigation routes from a navigation starting point to a navigation destination;

determining a current navigation route from the navigation routes according to selection by a user, and assigning remaining routes as backup navigation routes; and displaying, in a navigation map, the current navigation route in a first mode and displaying the backup navigation routes in a second mode different from the first mode.

In the solutions of displaying navigation routes provided by the embodiments of the present disclosure, by planning, by a navigation server, at least two navigation routes based on a navigation starting point, a navigation destination and a corresponding navigation route determining rule, a navigation terminal receives the at least two navigation routes sent by the navigation server, current and backup navigation routes are determined from the at least two navigation routes based on selection by a user, the current navigation route is displayed in a first mode and the backup navigation route is displayed in a second mode different from the first mode in a navigation map, and the current navigation route is used to navigate for a user. In the embodiments of the present disclosure, by using the above technical solutions, the at least two navigation routes are planned for the user at the time of navigating, and the current navigation route and the backup navigation route are displayed in different display modes, which may provide more detailed navigation information for the user, and helps the user to perform a contrast and selection between different navigation routes, so that the user may clearly and conveniently distinguish the current navigation route from the backup navigation route, thereby satisfying the demands of users for individualized and convenient navigation and improving the user experience.

BRIEF DESCRIPTION OF THE DRAWINGS

To describe the technical solutions in the embodiments of the present disclosure more clearly, the drawings that need to be used in the embodiments are briefly introduced. Clearly, the drawings in the following description are merely some embodiments of the present disclosure, and those of ordinary skill in the art may further make modifications and replacements to these drawings without creative efforts.

DETAILED DESCRIPTION OF EMBODIMENTS

The technical solutions in the embodiments of the present disclosure are described clearly and completely below with reference to the accompanying drawings. Evidently, the described embodiments are only some rather than all embodiments of the present disclosure, and are used for explaining the principle of the present disclosure, but are not intended to limit the present disclosure. On the basis of the embodiments in the present disclosure, all other embodiments acquired by those of ordinary skill in the art without creative efforts shall belong to the protection scope of the present disclosure.

The First Embodiment

Figure 1:
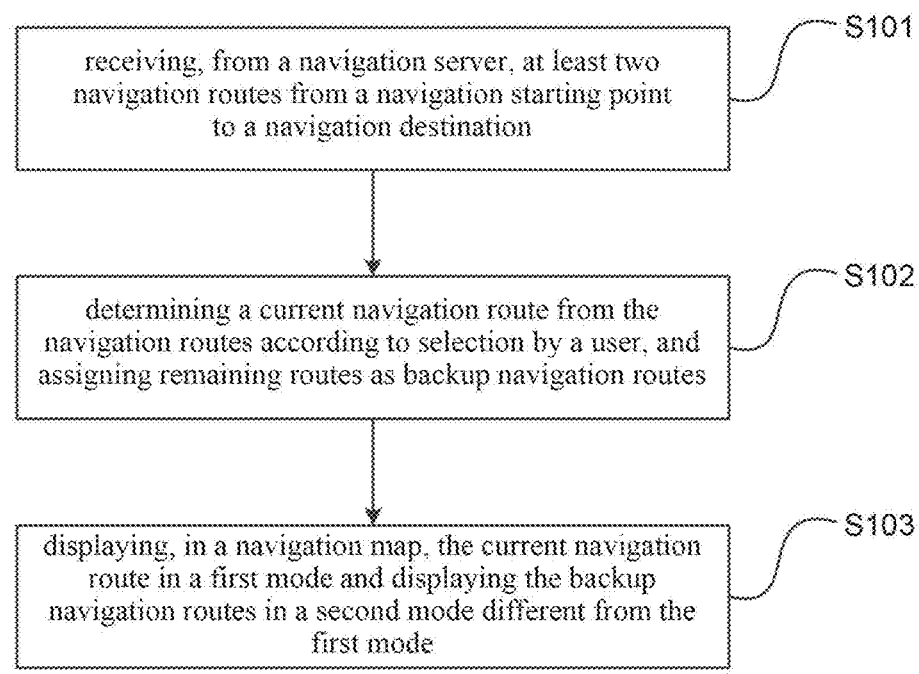
FIG. 1 is a flowchart of a method for displaying navigation routes according to the first embodiment of the present disclosure.

The first embodiment of the present disclosure provides a method for displaying navigation routes, and this method may be performed by an apparatus for displaying navigation routes. The apparatus may be implemented by software and/or hardware, and may be generally integrated into a navigation terminal. FIG. 1 is a flowchart of the method for displaying navigation routes according to the first embodiment of the present disclosure. As shown in FIG. 1, the method includes the following steps.

S101, receiving, from a navigation server, at least two navigation routes from a navigation starting point to a navigation destination.

When the navigation starting point is a current position of a user, the navigation starting point may be manually inputted or inputted by voice by the user through the navigation terminal. A current position of the navigation terminal (i.e., the current position of the user) may also be determined by locating the navigation terminal of the user through a GPS (Global Positioning System). The navigation terminal may be manually inputted or inputted by voice by the user through the navigation terminal. Herein, the navigation terminal may be a mobile terminal of the user, such as a cell phone, a tablet PC, a notebook PC, and may also be a navigation product, such as a navigator.

For example, before the receiving, from a navigation server, at least two navigation routes from a navigation starting point to a navigation destination, the method may further include: generating, by the navigation terminal, a navigation route planning instruction based on the navigation starting point and navigation destination of the user, and sending the navigation route planning instruction to the navigation server; and receiving, by the navigation server, the navigation route planning instruction sent by the navigation terminal, and planning the at least two navigation routes from the navigation starting point to the navigation destination based on navigation starting point information and navigation destination information included in the navigation route planning instruction, and then sending the planned at least two navigation routes from the navigation starting point to the navigation destination to the navigation terminal.

Preferably, the navigation server may plan the navigation routes based on the navigation starting point, the navigation destination and a preset navigation route determining rule. For example, when the navigation routes are planned, in overall consideration of a road preference of the user and driving time for the navigation routes, a route meeting the road preference of the user and shorter driving time may be preferably sent to the navigation terminal. The road preference of the user may include whether a freeway is preferable, whether a freeway is avoided and/or whether a toll is less, and so on. The road preference of the user may be defined by the user when using the navigation terminal the first time, and may also be autonomously selected by the user in the process of using the navigation terminal.

Preferably, when sending the navigation routes to the navigation terminal, the navigation server may simultaneously send road condition information of the navigation routes to the navigation terminal. The navigation terminal receives the navigation routes sent by the navigation server, and displays road condition information of every section of the routes onto the navigation map.

S102, determining a current navigation route from the navigation routes according to selection by a user, and assigning remaining routes as backup navigation routes.

When the user selects the current navigation route from the navigation routes, it can be determined by clicking a navigation route required on a screen of the navigation terminal. It is also possible that a navigation route selecting button is preset on the navigation terminal and a default switching sequence of the navigation routes is defined. Accordingly, a first navigation route is determined as the current navigation route when the user clicks a navigation route switching button, a second navigation route is determined as the current navigation route when the user clicks the navigation route switching button again, and so on, until the user selects a required, current navigation route. It is also possible that, the navigation route selecting button is preset on the navigation terminal and a name is defined for each navigation route (e.g., route 1, route 2, and route 3). Accordingly, when the user clicks the navigation route switching button, names for various navigation routes are shown to the user via the screen of the navigation terminal. After the user clicks a name of a navigation route, the navigation route corresponding to the name of this navigation route will be set as the current navigation route. By taking into account simplicity of the operation, preferably, the user may click the navigation route required on the screen of the navigation terminal to determine it as the current navigation route.

A largest display number of the backup navigation route may be flexibly set as required by the user when using the navigation terminal the first time or in the process of navigating using the navigation terminal, and may also be preset by a navigation system developer. Generally, the screen of the navigation terminal is not large, and the user needs to view the current navigation route and/or the backup navigation route in the navigation process. Therefore, the number of the backup navigation route should not be too large, to ensure clarity of the navigation routes on the screen of the navigation terminal and accuracy of viewing the navigation routes by the user. Preferably, the number of the backup navigation route may be ranged from 1 to 4. For example, the number of the backup navigation route may be set to 2.

S103, displaying, in a navigation map, the current navigation route in a first mode and displaying the backup navigation routes in a second mode different from the first mode.

Display modes of the current navigation route and the backup navigation route may be flexibly set. For example, the current navigation route and the backup navigation route may be set to different colors and/or brightnesses, and may also be set to different widths, which is not limited herein. In consideration of the recognition of the display modes, preferably, the current navigation route and the backup navigation route may be displayed in different brightnesses. That is, the current navigation route is displayed in a high brightness, and the backup navigation route is displayed in a normal brightness. Otherwise, the current navigation route is displayed in a normal brightness, and the backup navigation route is displayed in a low brightness. Herein, the display modes of the current navigation route and the backup navigation route in the navigation map may be flexibly set as required by the user, and may also be preset by the navigation system developer.

In the above technical solution, the navigation server determines at least two navigation routes according to a corresponding navigation route determining rule based on the navigation starting point and navigation destination of the user, the navigation terminal receives the at least two navigation routes sent by the navigation server, and determines the current and backup navigation routes from the at least two navigation routes based on the selection by the user, in the navigation map, the current navigation route is displayed in the first mode and the backup navigation route is displayed in the second mode different from the first mode, and the current navigation route is used to navigate for the user. In the embodiment of the present disclosure, by using the above technical solution, the at least two navigation routes are planned for the user at the time of navigating, and the current navigation route and the backup navigation route are displayed in different display modes, which may provide more detailed navigation information for the user, and helps the user to perform a contrast and selection between different navigation routes, so that the user may clearly and conveniently distinguish the current navigation route from the backup navigation route, thereby improving the user experience.

The Second Embodiment

Figure 2:
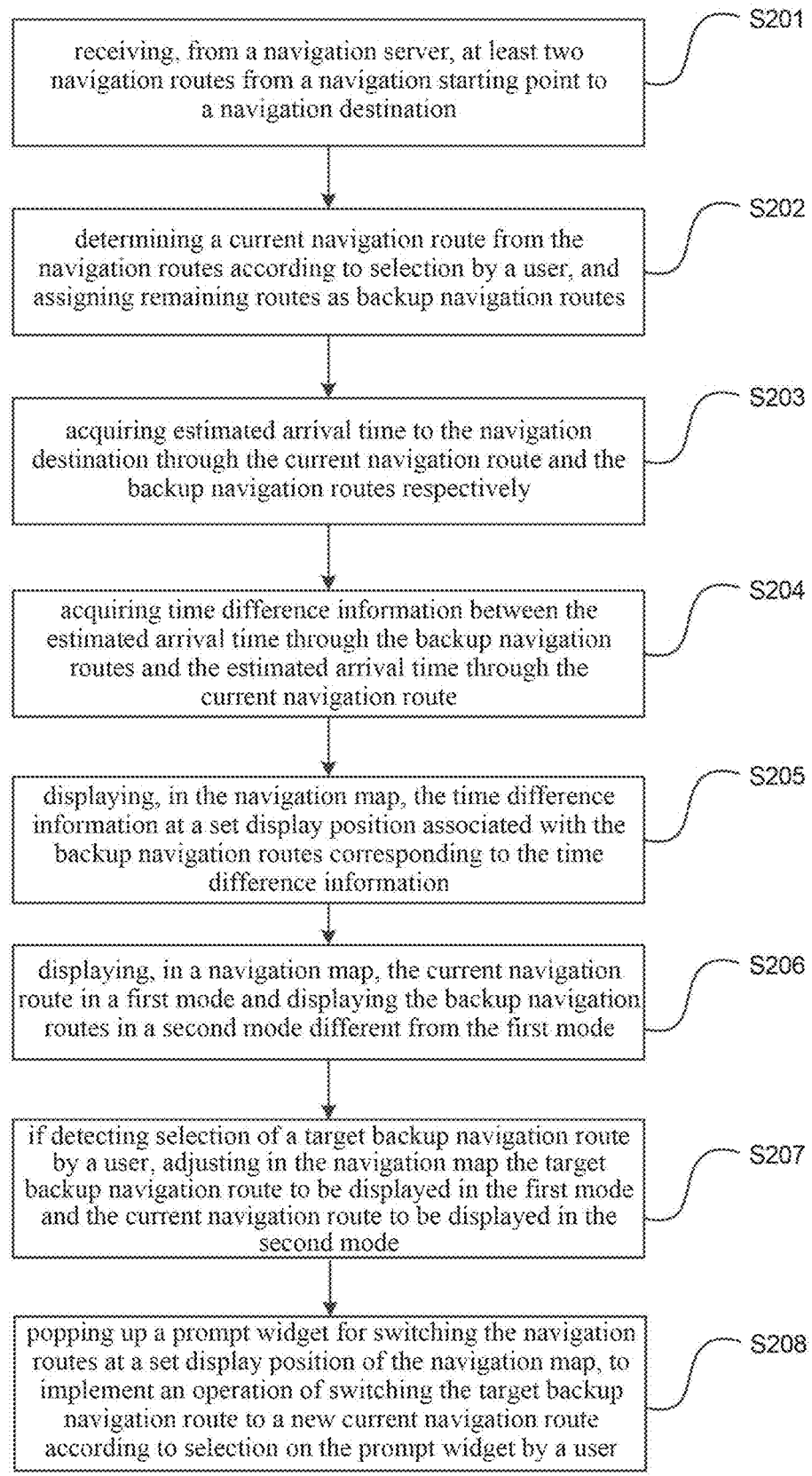
FIG. 2 is a flowchart of a method for displaying navigation routes according to the second embodiment of the present disclosure.

FIG. 2 is a flowchart of a method for displaying navigation routes according to the second embodiment of the present disclosure. This embodiment is optimized on the basis of the above embodiment. Further, the method for displaying navigation routes provided by the embodiment of the present disclosure further includes: acquiring estimated arrival time to the navigation destination through the current navigation route and the backup navigation routes respectively; acquiring time difference information between the estimated arrival time through the backup navigation routes and the estimated arrival time through the current navigation route; and displaying, in the navigation map, the time difference information at a set display position associated with the backup navigation routes corresponding to the time difference information.

Further, the method for displaying navigation routes provided by the embodiment of the present disclosure further includes: if detecting selection of a target backup navigation route by a user, adjusting in the navigation map the target backup navigation route to be displayed in the first mode and the current navigation route to be displayed in the second mode; and popping up a prompt widget for switching the navigation routes at a set display position of the navigation map, to implement an operation of switching the target backup navigation route to a new current navigation route according to selection on the prompt widget by a user.

Correspondingly, the method for displaying navigation routes provided by this embodiment of the present disclosure may include the following steps.

S201, receiving, from a navigation server, at least two navigation routes from a navigation starting point to a navigation destination.

S202, determining a current navigation route from the navigation routes according to selection by a user, and assigning remaining routes as backup navigation routes.

S203, acquiring estimated arrival time to the navigation destination through the current navigation route and the backup navigation routes respectively.

Herein, the estimated arrival time at the navigation destination through the current navigation route and the backup navigation route may be acquired by the navigation server, and may also be acquired by the navigation terminal, which is not limited herein.

For example, the estimated arrival time at the navigation destination through the current navigation route and the backup navigation route may be calculated based on distances from the current position of the user to the navigation destination of these navigation routes, road condition information of every section of these navigation routes, and a driving speed (or an average driving speed) of a vehicle to which the navigation terminal belongs. By taking into account simplicity of the calculation, preferably, when estimated time of some section is calculated, the estimated time may be calculated using an average driving speed of the vehicle having the navigation terminal on this section. For instance, on a navigation route, a driving distance from the current position of the navigation terminal to the navigation destination is 69 km, and on the navigation route, there is one congested section, a driving distance of which is 4 km, one section in a normal road condition, a driving distance of which is 5 km, and three clear sections, driving distances of which are respectively 15 km, 18 km and 27 km. Assuming an average driving speed of the vehicle having the navigation terminal on the congested section is 10 km/h, an average driving speed on the normal section is 20 km/h, and an average driving speed on the clear sections is 40 km/h, estimated arrival time at the navigation destination through this navigation route is T=4/10+5/20+15/40+18/40+27/40=2.15 h. That is, the estimated time of the vehicle having the navigation terminal of arriving at the navigation destination through the navigation route is 2.15 hours.

S204, acquiring time difference information between the estimated arrival time through the backup navigation routes and the estimated arrival time through the current navigation route.

For example, time difference information between each backup navigation route and the current navigation route may be calculated and sent to the navigation terminal by the navigation server, and may also be directly calculated by the navigation terminal. After the estimated time of each backup navigation route and the estimated arrival time traversing the current navigation route are acquired, the time difference information between each backup navigation route and the current navigation route can be acquired by respectively subtracting the estimated time of each backup navigation route from the estimated arrival time traversing the current navigation route.

According to positive and negative values of the results of the subtraction, "faster" and "slower" and other text information may be added into the time difference information. For instance, when the estimated arrival time traversing the current navigation route is 45 minutes, estimated time of a first backup navigation route is 43 minutes, and estimated time of a second backup navigation route is 54 minutes, time difference information between the estimated time of the first backup navigation route and the estimated arrival time traversing the current navigation route may be "2 minutes faster," and time difference information between the estimated time of the second backup navigation route and the estimated arrival time traversing the current navigation route may be "9 minutes slower."

S205, displaying, in the navigation map, the time difference information at a set display position associated with the backup navigation routes corresponding to the time difference information.

Preferably, the time difference information may be displayed in the navigation map in a form of a time tag, and the time tag is set to associate with its corresponding navigation route. A position of the time tag may be flexibly set as required, for instance, may be set near a display position of the corresponding navigation route and pointed to the corresponding navigation route using a sign possessing a directing function (e.g., an arrow). At this point, preferably, a time tag of a navigation route may be set near a section of this navigation route not overlapping with other navigation routes. That is, when this navigation route has a specific navigation section, the time tag of this navigation route may be set near the specific section of the navigation route, which helps the user determine accurately a navigation route to which a time tag belongs.

Figure 3A:
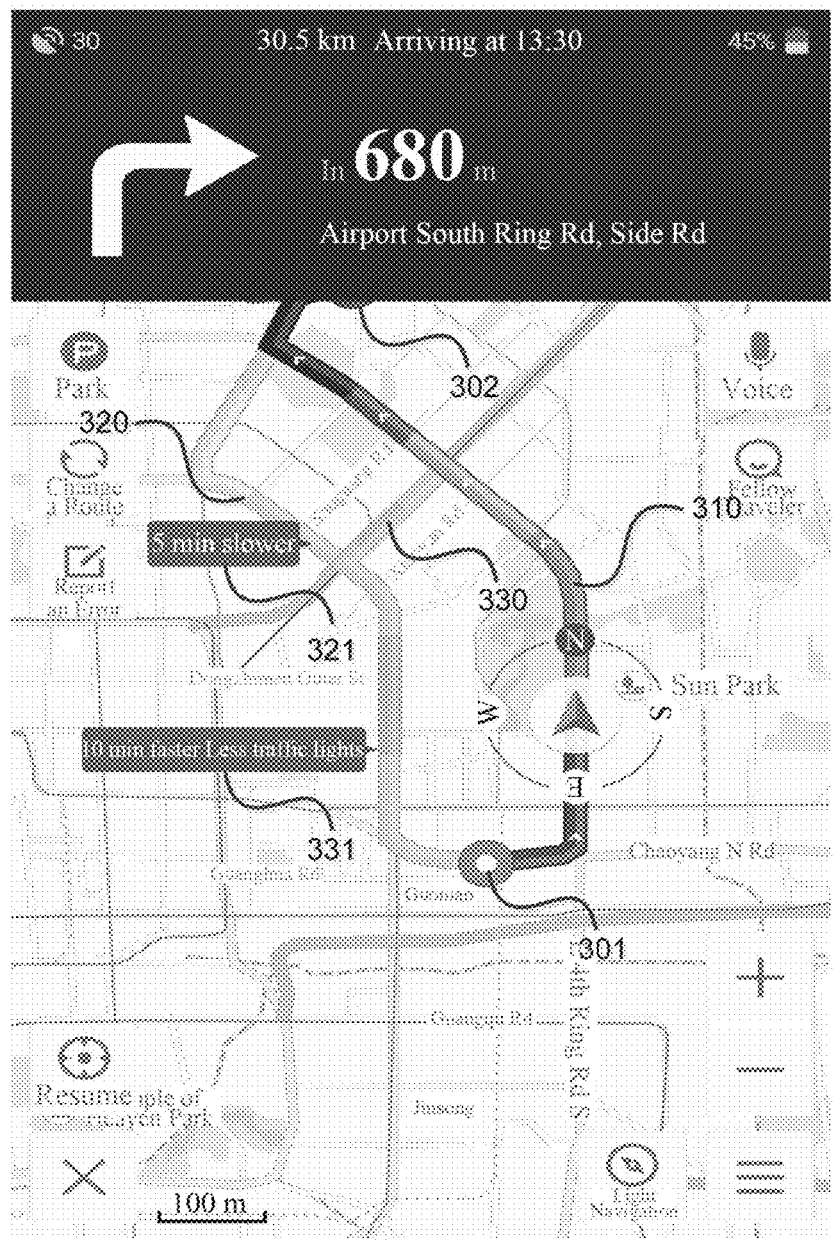
FIG. 3A is a diagram of displaying a navigation interface before a target backup navigation route is selected by a user according to the second embodiment of the present disclosure.

For example, as shown in FIG. 3A, there are 3 navigation routes (a first navigation route 310, a second navigation route 320 and a third navigation route 330) from a navigation starting point 301 to a navigation destination 302. Assuming the first navigation route 310 is the current navigation route, and the second navigation route 320 and the third navigation route 330 are the backup navigation route. Time difference information between the second navigation route 320 and the first navigation route 310 (i.e., the current navigation route) may be annotated in a form of a time tag 321 near a display position of the second navigation route 320 and be associated with the second navigation route 320, and time difference information between the third navigation route 330 and the first navigation route 310 (i.e., the current navigation route) may be annotated in a form of a time tag 331 near a display position of the third navigation route 330 and be associated with the third navigation route 330. A time tag may be set near any section of its corresponding navigation route (e.g., the set position of the time tag 331 of the third navigation route 330), which is not limited herein. In consideration of recognition of a correlation between the time tag and the navigation route, preferably, the time tag may be set near a specific section of the corresponding navigation route (e.g., the set position of the time tag 321 of the second navigation route 320).

S206, displaying, in a navigation map, the current navigation route in a first mode and displaying the backup navigation routes in a second mode different from the first mode.

S207, if detecting selection of a target backup navigation route by a user, adjusting in the navigation map the target backup navigation route to be displayed in the first mode and the current navigation route to be displayed in the second mode.

Preferably, after the adjusting in the navigation map to display the target backup navigation route in the first mode and to display the current navigation route in the second mode, the method may further include: acquiring time difference information between the estimated time of the navigation route displayed in the second mode and the estimated time of the target backup navigation route; and displaying, in the navigation map, the time difference information at a set display position associated with the navigation route displayed in the second mode and corresponding to the time difference information.

It should be noted that, before the displaying the time difference information at a set display position associated with the navigation route displayed in the second mode and corresponding to the time difference information, the time difference information between every backup navigation route and the current navigation route in the navigation map should be first blanked, so as to ensure that the time difference information between the navigation route currently displayed in the second mode and every navigation route currently displayed in the first mode can be clearly displayed on the navigation map.

For example, when the user selects a backup navigation route, the backup navigation route may be selected by directly clicking a corresponding position on a screen. A navigation route selecting button may also be set on the screen of the navigation terminal or on the navigation terminal. If the user clicks the navigation route selecting button, a name of each navigation route is popped up, and a navigation route to be selected by the user is determined based on the selection of the names of the navigation routes by the user. In consideration of facilitation of the selection of the backup navigation route by the user, preferably, the user may select the target backup navigation route by clicking directly a required backup navigation route or a time tag of this backup navigation route. At this point, preferably, when the time difference information is displayed in the navigation map in the form of the time tag, the detecting the selection of the target backup navigation route by a user includes: detecting selection of the backup navigation route by a user from the navigation routes, or detecting selection of one of the time tags of the backup navigation routes by a user.

S208, popping up a prompt widget for switching the navigation routes at a set display position of the navigation map, to implement an operation of switching the target backup navigation route to a new current navigation route according to selection on the prompt widget by a user.

A position of the prompt widget of switching the navigation routes may be flexibly set as required. Preferably, the prompt widget of switching the navigation routes may be set at a position not affecting the display for the current navigation route and backup navigation routes in the navigation map, for example, may be set at a lower part of the screen of the navigation terminal.

Herein, a process of readjusting the display of the navigation routes based on the selection by the user by the navigation terminal and/or the navigation server may include: detecting whether the user selects a backup navigation route or a time tag of the backup navigation route, and navigating unceasingly for the user based on the current display interface and the current navigation route if the user does not select; if the user selects a backup navigation route or a time tag of a backup navigation route, displaying the backup navigation route selected by the user (i.e., the target backup navigation route) in the first display mode, adjusting to display the current navigation route in the second mode, calculating time difference information between a remaining backup navigation route and the target backup navigation route and between the current navigation route and the target backup navigation route, associating the time difference information with its corresponding navigation route to display, popping up the prompt widget of switching the navigation routes at a preset display position to provide selection for the user, adjusting the target backup navigation route to the current navigation route and navigating for the user based on the current navigation route if the click of the user for the prompt widget is detected; and if the user does not click the prompt widget of switching the navigation routes in a preset time period, adjusting the display modes of the navigation routes in the navigation map to original display modes and redisplaying the time difference information between each backup navigation route and the current navigation route.

Figure 3B:
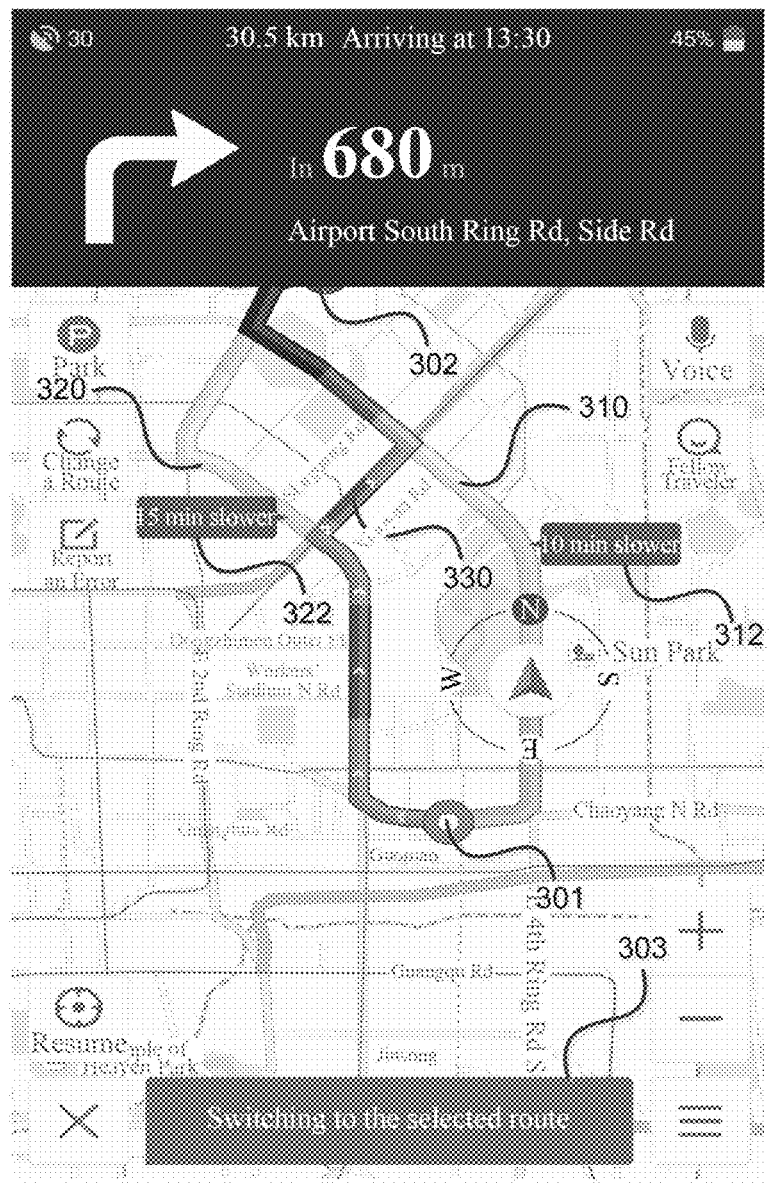
FIG. 3B is a diagram of displaying a navigation interface after the target backup navigation route is selected by the user according to the second embodiment of the present disclosure.

For example, FIG. 3A is a diagram of displaying a navigation interface before a target backup navigation route is selected by a user, and FIG. 3B is a diagram of displaying a navigation interface after the target backup navigation route is selected by the user. As shown in FIGS. 3A and 3B, there are three navigation routes from the navigation starting point 301 to the navigation destination 302, i.e., the first navigation route 310, the second navigation route 320, and the third navigation route 330. Assuming the first navigation route 310 is the current navigation route, the second navigation route 320 and the third navigation route 330 are the backup navigation routes, the third navigation route 330 is the target backup navigation route, the first display mode is a highlight mode, and the second display mode is a normal mode. The process of readjusting the display of the navigation routes based on the selection by the user by the navigation terminal and/or the navigation server may include: detecting whether the user clicks the second navigation route 320 or the third navigation route 330 and whether the user clicks the time tag 321 of the second navigation route 320 or the time tag 331 of the third navigation route 330; and if the user clicks (assuming the user selects the third navigation route 330 herein), a corresponding navigation route display instruction being generated based on the selection by the user, adjusting the third navigation route 330 (as shown in FIG. 3A) displayed normally in the navigation map to be displayed in a highlight mode, and adjusting the current navigation route 320 (as shown in FIG. 3A) from being displayed in the highlight mode to being displayed in a normal mode; blanking the time tag 321 of second navigation route 320 and the time tag 331 of the third navigation route 330; acquiring time difference information between the third navigation route 330 and the current navigation route 310 (i.e., the first navigation route 310), and time difference information between the third navigation route 330 and the second navigation route 320 respectively; displaying the time difference information between the first navigation route 310 and the third navigation route 330 at a position associated with the first navigation route 310 in the form of time tag 312 and displaying the time difference information between the second navigation route 320 and the third navigation route 330 at a position associated with the second navigation route 320 in the form of time tag 322; popping up a prompt widget 303 of switching the navigation routes, detecting whether the user clicks the prompt widget 303, and if the user clicks, adjusting the third navigation route 330 to a current navigation route and navigating for the user according to the navigation route 330; and if the user does not click, switching the navigation interface to the original display interface (as shown in FIG. 3A), and navigating unceasingly for the user according to the current navigation route (i.e., the first navigation route 310).

It should be noted that, in this embodiment, the subsequence of performing the various steps is not unique and fixed, and may be flexibly set as required. For example, S203, S204 and S205 may be performed after S202, and may also be performed after S206, or may be simultaneously performed with S202 or S206, and other sequences used to perform the steps in this embodiment shall belong to the protection scope of the present disclosure.

With the above technical solution provided by the embodiment of present disclosure, the time difference information between the current navigation route and each backup navigation route is respectively acquired, and the time difference information is displayed at positions associated with the navigation routes corresponding to the time difference information in a form of a time tag, so that the user may clearly understand a difference between every backup navigation route and the current navigation route, which helps the user to determine whether the current navigation route is used to navigate; if the selection of the target backup navigation route by the user is detected, the target backup navigation route is displayed using the first display mode, the current navigation route is displayed using the second mode, the time difference information between the target navigation route and each navigation route displayed in the second mode is displayed, the prompt widget of switching the navigation routes is popped up, and the target backup navigation route can be adjusted to a current navigation route if the user clicks the prompt widget, which can make the user accurately and quickly understand time differences between other navigation routes and the target backup navigation route and switch the current navigation route, thereby reducing time and steps for the user to switch the navigation route, and improving the user experience.

The Third Embodiment

The third embodiment of the present disclosure provides a method for displaying navigation routes and this embodiment is optimized on the basis of the above embodiments. Further, the method for displaying navigation routes provided by the embodiment of the present disclosure further includes: blanking deviated backup navigation routes in the navigation map, if a current position of a user deviating from the backup navigation route is determined during a route navigation.

Further, the method for displaying navigation routes provided by the embodiment of the present disclosure further includes: sending a route re-planning request to the navigation server if the current position of the user is detected as not being in any one of the current navigation route and the backup navigation routes, wherein the route re-planning request including the current position and the navigation destination; and receiving at least two re-planned navigation routes returned by the navigation server, and displaying a route having a highest recommendation weight of the re-planned navigation routes in the first mode as a current navigation route, displaying a remaining route in the second mode as the backup navigation routes.

Figure 4:
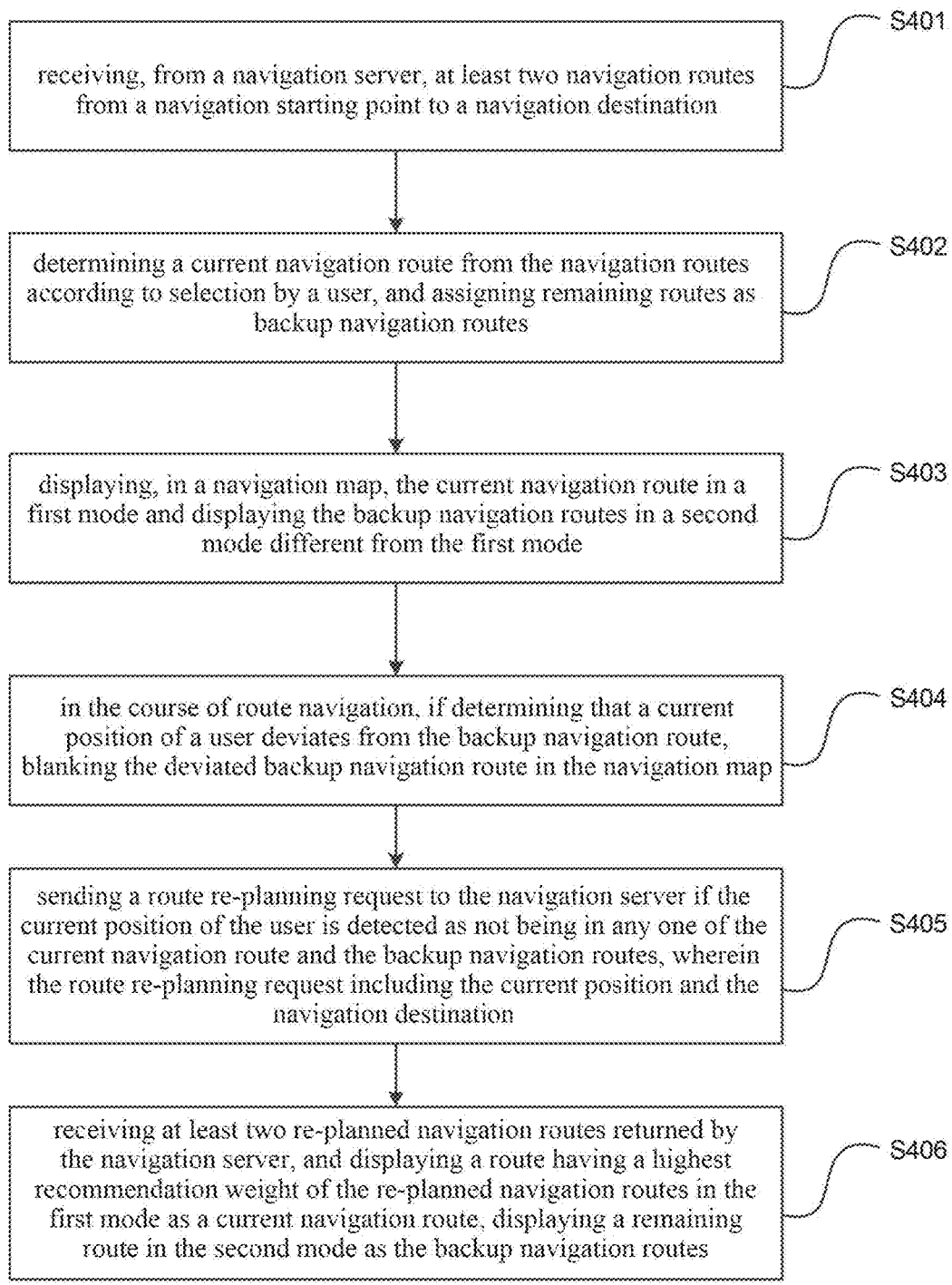
FIG. 4 is a flowchart of a method for displaying navigation routes according to the third embodiment of the present disclosure.

FIG. 4 is a flowchart of a method for displaying navigation routes according to this embodiment of the present disclosure. As shown in FIG. 4, the method provided by the embodiment of the present disclosure may include the following steps.

S401, receiving, from a navigation server, at least two navigation routes from a navigation starting point to a navigation destination.

S402, determining a current navigation route from the navigation routes according to selection by a user, and assigning remaining routes as backup navigation routes.

S403, displaying, in a navigation map, the current navigation route in a first mode and displaying the backup navigation routes in a second mode different from the first mode.

S404, in the course of route navigation, if determining that a current position of a user deviates from the backup navigation route, blanking the deviated backup navigation route in the navigation map.

Preferably, if the user normally drives ahead according to the current navigation route but cannot drive into a backup navigation route, it can be considered as that the current position of the user deviates from a position of this backup navigation route. That is, the user has driven through an intersection of the current navigation route and this backup navigation route, and accordingly, it is considered as that the current position of the user deviates from the backup navigation route.

For example, the process of blanking the deviated backup navigation routes in the navigation map may include: first, changing the display mode of the backup navigation route to a display mode of other non-navigation routes; then deleting navigation information corresponding to every section of the deviates; and finally deleting the time difference information between the backup navigation route and the current navigation route and the time tags.

Preferably, the method for displaying navigation routes provided by the embodiment of the present disclosure further includes: in the course of route navigation, if determining that a number of the currently displayed backup navigation routes being less than one, acquiring at least one backup navigation route different from the current navigation route according to the current position of the user and the navigation destination, and displaying the acquired backup navigation routes in the second mode.

For example, if the backup navigation route in the navigation map have been blanked (i.e., there remains one navigation route as the current navigation route in the navigation map), a navigation terminal sends a navigation route planning instruction including current position information of the user, navigation destination information and information of the current navigation route to a navigation server. The navigation server plans at least one navigation route different from the current navigation route based on the current position information of the user, the navigation destination information and a corresponding navigation route determining rule and sends it to the navigation terminal. The navigation terminal receives the at least one navigation route different from the current navigation route sent by the navigation server, and assigns the navigation route as a backup navigation route to display. That is, the received at least one navigation route is displayed using the second mode.

S405, sending a route re-planning request to the navigation server if the current position of the user is detected as not being in any one of the current navigation route and the backup navigation routes, wherein the route re-planning request including the current position and the navigation destination.

Correspondingly, the navigation server receives the route re-planning request sent by the navigation terminal, re-plans navigation routes based on the information of the current position and navigation destination information included in the route re-planning request, and sends the planned navigation routes to the navigation terminal.

S406, receiving at least two re-planned navigation routes returned by the navigation server, and displaying a route having a highest recommendation weight of the re-planned navigation routes in the first mode as a current navigation route, displaying a remaining route in the second mode as the backup navigation routes.

In consideration of a size of a screen of the navigation terminal, when a number of the re-planned navigation routes returned by the server is large, preferably, the re-planned navigation routes may be sorted according to their recommendation weights. The re-planned navigation routes fitting a preset number and having higher recommendation weights are selected to display. Herein, the preset display number may be set as required by the user, and may also be set by a navigation service developer by default at the time of developing navigation systems. Preferably, the preset display number should not be set too large, for instance, may be set to 3, so that the user can clearly distinguish a specific driving route and road condition information of each re-planned navigation route.

For example, the recommendation weights of the re-planned navigation routes may be determined according to driving time from the current position to the navigation destination through each navigation route and a safety factor of driving through each navigation route. Preferably, a navigation route having a higher safety factor and shorter driving time is set to the navigation routes having a higher recommendation weight. The driving time from the current position to the navigation destination through a navigation route may be determined by road condition information of each section of this navigation route, a driving distance of each section of this navigation route and a driving speed of a vehicle having the navigation terminal.

With the technical solution of the embodiment of the present disclosure, first, in the navigation process, whether the current position of the user deviates from the backup navigation route in the navigation map is detected, the deviated backup navigation route is blanked in the navigation map if the user deviates from the backup navigation route in the navigation map, which may timely filter out useless navigation information and ensure that the navigation routes displayed in the navigation map are practicable navigation routes; secondly, whether a number of backup navigation routes in the navigation map is less than one is detected after the backup navigation route is blanked, and if the number is less than one, the at least one backup navigation route different from the current navigation route is acquired according to the current position information of the user and the navigation destination information of the user, and the acquired backup navigation route is displayed in the second mode, which may ensure options of the user for the navigation routes in the navigation process, and if is found that the current navigation route is not easily to drive, the navigation routes may be switched at any time, so that the user may have more options for the navigation routes, thereby improving the user experience; and thirdly, in the navigation process, whether the current position of the user is in any navigation route among the current navigation route and backup navigation route is detected, if the current position is in, at least two navigation routes are re-planned for the user and the route having the highest recommendation weight thereof is assigned as the current navigation route to navigate, which can reduce the time and step for re-planning routes without re-inputting the navigation starting point and the navigation destination by the user, thereby reducing waiting time of the user.

The Fourth Embodiment

Figure 5:
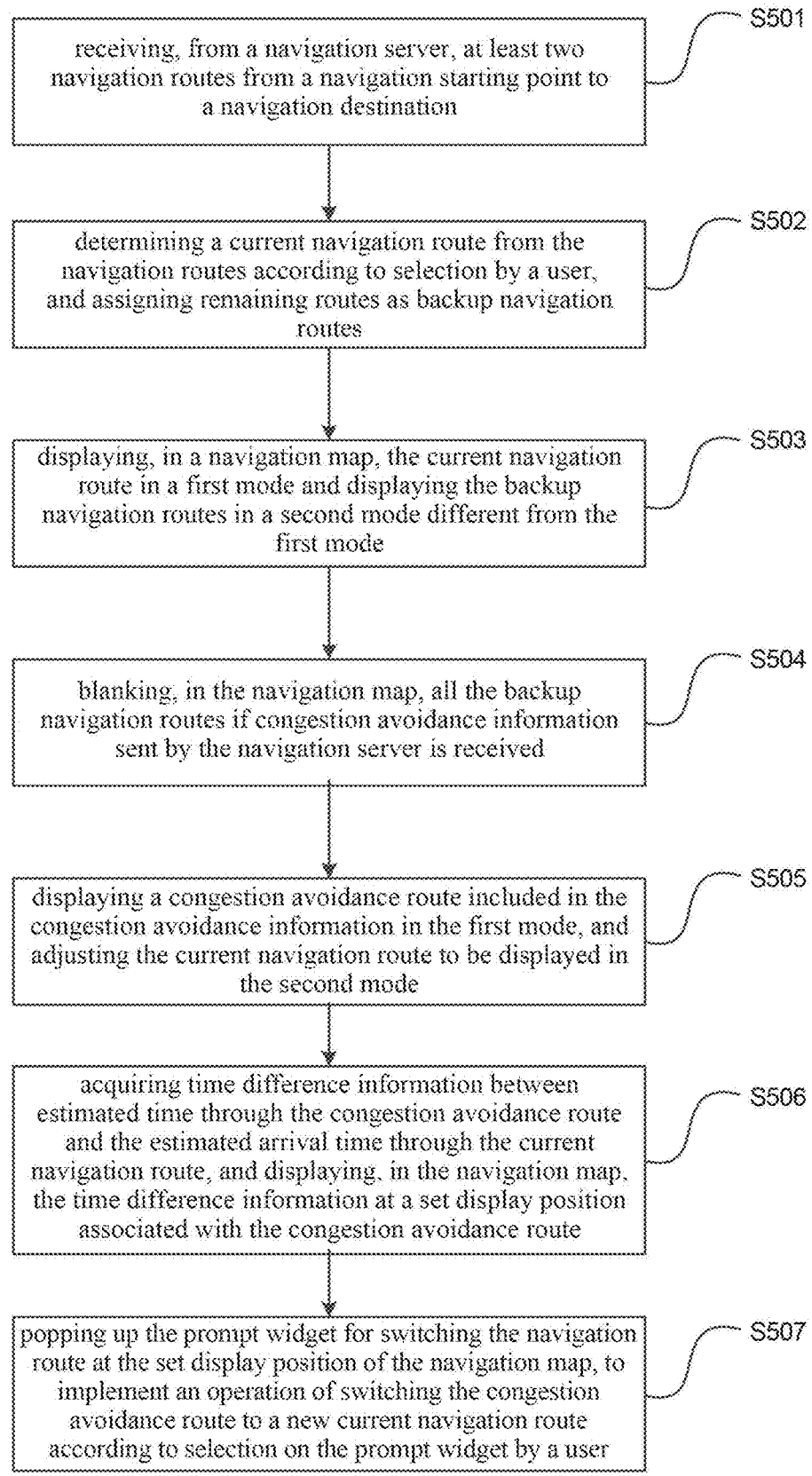
FIG. 5 is a flowchart of a method for displaying navigation routes according to the fourth embodiment of the present disclosure.

FIG. 5 is a flowchart of a method for displaying navigation routes according to the fourth embodiment of the present disclosure, and this embodiment of the present disclosure is optimized on the basis of the above embodiments. Further, the method for displaying navigation routes provided by the embodiment of the present disclosure further includes: blanking, in the navigation map, all the backup navigation routes if congestion avoidance information sent by the navigation server is received; displaying a congestion avoidance route included in the congestion avoidance information in the first mode, and adjusting the current navigation route to be displayed in the second mode; acquiring time difference information between estimated time through the congestion avoidance route and the estimated arrival time through the current navigation route, and displaying, in the navigation map, the time difference information at a set display position associated with the congestion avoidance route; and popping up the prompt widget for switching the navigation route at the set display position of the navigation map, to implement an operation of switching the congestion avoidance route to a new current navigation route according to selection on the prompt widget by a user.

Correspondingly, the method for displaying navigation routes provided by the embodiment of the present disclosure may include:

S501, receiving, from a navigation server, at least two navigation routes from a navigation starting point to a navigation destination.

S502, determining a current navigation route from the navigation routes according to selection by a user, and assigning remaining routes as backup navigation routes.

S503, displaying, in a navigation map, the current navigation route in a first mode and displaying the backup navigation routes in a second mode different from the first mode.

S504, blanking, in the navigation map, all the backup navigation routes if congestion avoidance information sent by the navigation server is received.

For example, when the navigation terminal navigates for the user using the current navigation route, the navigation server may detect road condition information of every section of the current navigation route in real time. If it is detected that congestion occurs on the current navigation route, the congestion avoidance route from the current position of the user to the navigation destination is re-planned for the user, and congestion avoidance information including the congestion avoidance route is generated and sent to the navigation terminal. The congestion avoidance route may be one of the backup navigation route displayed in the navigation map, and may also be a wholly new navigation route re-planned and different from any navigation route in the current navigation map, which is not limited herein.

Preferably, when the backup navigation route entirely in the navigation map are blanked, a time tag of each backup navigation route of the navigation routes may also be simultaneously blanked.

S505, displaying a congestion avoidance route included in the congestion avoidance information in the first mode, and adjusting the current navigation route to be displayed in the second mode.

Preferably, after the displaying a congestion avoidance route included in the congestion avoidance information in the first mode and adjusting to display the current navigation route in the second mode, the method further includes: adding a current navigation route tag at a set display position associated with the current navigation route, and adding a congestion avoidance route tag at a set display position associated with the congestion avoidance route.

S506, acquiring time difference information between estimated time through the congestion avoidance route and the estimated arrival time through the current navigation route, and displaying, in the navigation map, the time difference information at a set display position associated with the congestion avoidance route.

For example, time difference information between the congestion avoidance route and the current navigation route may be displayed in a form of a time tag. If the congestion avoidance route tag is added to the set display position associated with the congestion avoidance route when the congestion avoidance route is displayed, the congestion avoidance route tag and the time tag may be two separate tags, and may also be displayed in the same tag. In consideration of clarity and simplicity of the display interface of the navigation map, preferably, the time tag of the congestion avoidance route may be combined with the congestion avoidance route tag, and displayed using the same tag. At this point, the time difference information may be added to an upper part or lower part in the original congestion avoidance route tag, and may also be added to other positions in the original congestion avoidance route tag, which is not limited herein.

S507, popping up the prompt widget for switching the navigation route at the set display position of the navigation map, to implement an operation of switching the congestion avoidance route to a new current navigation route according to selection on the prompt widget by a user.

Preferably, if the operation of switching, by the user, the congestion avoidance route to a new current navigation route is not detected within a defined time interval, the current navigation route is readjusted to display in the first mode; and the congestion avoidance route is assigned as a backup navigation route to display in the second mode. The defined time interval, in which whether the user adjusts the congestion avoidance route to the current navigation route is detected, may be autonomously set as required by the user, and may also be set by the navigation system developer by default at the time of developing. When the defined time interval is set, a minimum value in the defined time interval should not be set too large, otherwise, it will result in a longer waiting time for the user when switching the congestion avoidance route to the current navigation route. A maximum value in the defined time interval should not be set too small, otherwise, it will cause the navigation interface of the navigation terminal to be converted to a display mode that the current navigation route is displayed in the first mode and the congestion avoidance route is displayed in the second mode, before the user clicks the prompt widget of switching the navigation routes. Therefore, the defined time interval, in which whether the user adjusts the congestion avoidance route to the current navigation route is detected, should be reasonably set, for instance, the defined time interval may be set to [0 s, 10 s].

Figure 6:
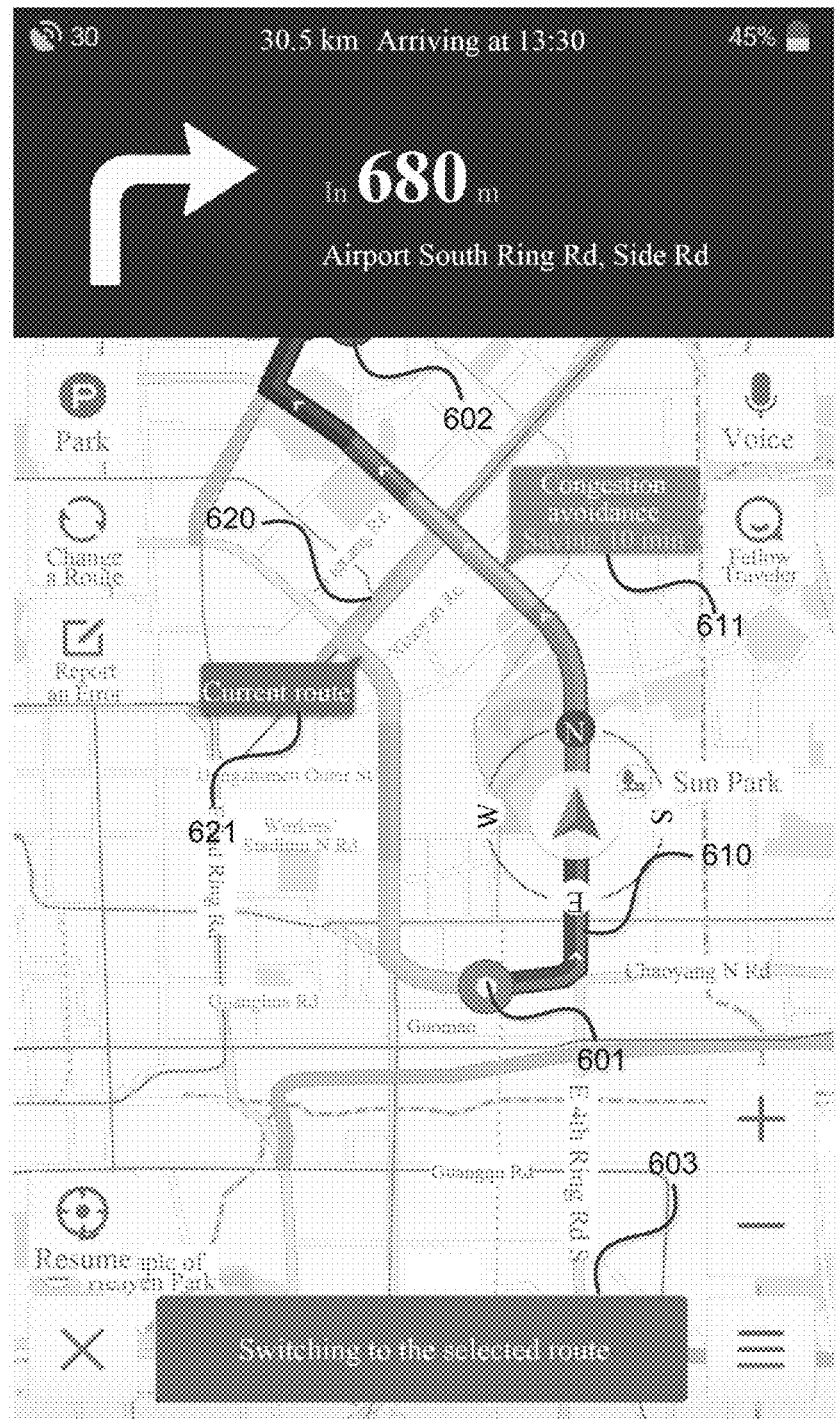
FIG. 6 is a diagram of displaying a navigation map interface after congestion avoidance route information is received according to the fourth embodiment of the present disclosure.

For example, as shown in FIG. 6, after the congestion avoidance navigation route sent by the navigation system is received, a changing process of the display of the navigation interface of the navigation terminal may include: blanking the backup navigation route and the time tag of each backup navigation route in the navigation map; displaying a congestion avoidance route 610 included in the received congestion avoidance information in the first mode, and adjusting to display a current navigation route 620 in the second mode; adding a current navigation route tag 621 to a set display position associated with the current navigation route 620, and adding a congestion avoidance route tag 611 to a set display position associated with the congestion avoidance route; acquiring time difference information between the congestion avoidance route 610 and the current navigation route 620, and displaying it into the congestion avoidance route tag 611; popping up a prompt widget 603 of switching the navigation routes and detecting whether the user clicks the prompt widget 603 of switching the navigation routes within the defined time interval, and if the user clicks, switching the congestion avoidance route 610 to a current navigation route and navigating for the user using the current navigation route (the congestion avoidance route 610); and if the user does not click, displaying the current navigation route 620 using the first mode, displaying the congestion avoidance route 610 using the second mode, and navigating for the user using the current navigation route 620.

With the technical solution of this embodiment of the present disclosure, when congestion occurs on the current navigation route of the user, a congestion avoidance route from the current position of the user to the navigation destination can be automatically planned for the user and displayed in the first mode, and the prompt widget of switching the navigation routes is popped up for the user to complete the operation of switching the navigation routes, which may effectively reduce operating procedures for clicking the re-planned navigation routes after the user finds the congestion occurring in the current road, so that the user has enough time to switch the navigation routes, thereby improving the user experience.

The Fifth Embodiment

Figure 7:
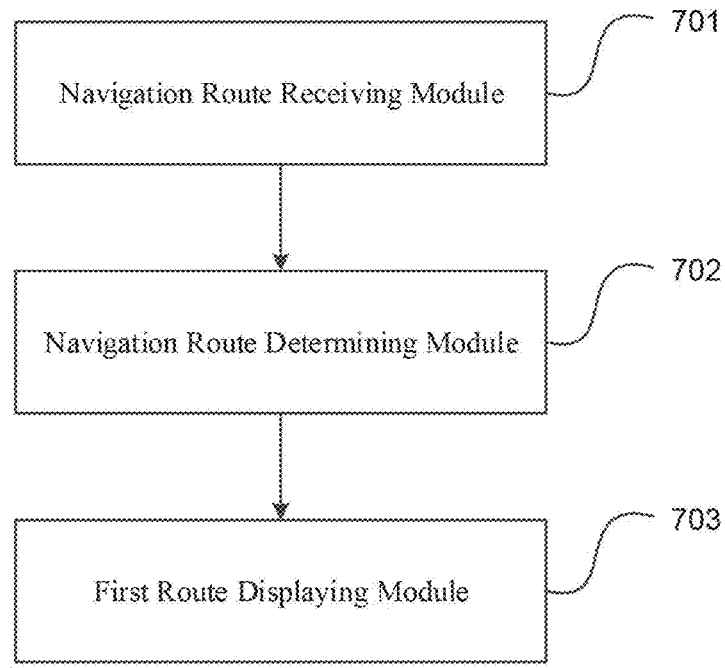
FIG. 7 is a structural block diagram of an apparatus for displaying navigation routes according to the fifth embodiment of the present disclosure.

FIG. 7 is a structural block diagram of an apparatus for displaying navigation routes according to the fifth embodiment of the present disclosure. This apparatus may be implemented by software and/or hardware, and may be generally integrated into a navigation terminal. The apparatus may display navigation routes by performing the method for displaying navigation routes. As shown in FIG. 7, the apparatus includes:

a navigation route receiving module 701, configured to receive, from a navigation server, at least two navigation routes from a navigation starting point to a navigation destination;

a navigation route determining module 702, configured to determine a current navigation route from the navigation routes according to selection by a user, and assign remaining routes as backup navigation routes; and a first route displaying module 703, configured to display, in a navigation map, the current navigation route in a first mode and display the backup navigation routes in a second mode different from the first mode.

Further, the apparatus for displaying navigation routes provided by this embodiment of the present disclosure may further include: a time acquiring module, configured to acquire estimated arrival time to the navigation destination through the current navigation route and the backup navigation routes respectively; a first time difference acquiring module, configured to acquire time difference information between the estimated arrival time through the backup navigation routes and the estimated arrival time through the current navigation route; and a first time difference displaying module, configured to display, in the navigation map, the time difference information at a set display position associated with the backup navigation routes corresponding to the time difference information.

Further, the apparatus for displaying navigation routes provided by this embodiment of the present disclosure may further include: a second route displaying module, configured to, if detecting selection of a target backup navigation route by a user, adjust in the navigation map the target backup navigation route to be displayed in the first mode and the current navigation route to be displayed in the second mode; and a first route adjusting module, configured to pop up a prompt widget for switching the navigation routes at a set display position of the navigation map, to implement an operation of switching the target backup navigation route to a new current navigation route according to selection on the prompt widget by a user.

Further, the apparatus for displaying navigation routes provided by this embodiment of the present disclosure may further include: a second time difference acquiring module, configured to acquire time difference information between the estimated time through the navigation route displayed in the second mode and the estimated time through the target backup navigation route, after the adjusting in the navigation map the target backup navigation route to be displayed in the first mode and the current navigation route to be displayed in the second mode; and a second time difference displaying module, configured to display, in the navigation map, the time difference information at a set display position associated with the navigation route that is displayed in the second mode and corresponds to the time difference information.

Further, the time difference information is displayed in the navigation map in a form of a time tag. Correspondingly, the second route displaying module is specifically configured to, if detecting selection of the backup navigation route by a user from the navigation routes or selection of one of the time tags of the backup navigation route by a user, adjust in the navigation map the target backup navigation route to be displayed in the first mode and the current navigation route to be displayed in the second mode.

Further, the apparatus for displaying navigation routes provided by this embodiment of the present disclosure may further include: a first route blanking module, configured to, in the course of route navigation, if determining that a current position of a user deviates from the backup navigation route, blank the deviated backup navigation route in the navigation map.

Further, the apparatus for displaying navigation routes provided by this embodiment of the present disclosure may further include: a route acquiring module, configured to, in the course of route navigation, if determining that a number of the currently displayed backup navigation routes being less than one, acquire at least one backup navigation route different from the current navigation route according to the current position of the user and the navigation destination, and display the acquired backup navigation routes in the second mode.

Further, the apparatus for displaying navigation routes provided by this embodiment of the present disclosure may further include: a second route blanking module, configured to blank, in the navigation map, all the backup navigation routes if congestion avoidance information sent by the navigation server is received; a third route displaying module, configured to display a congestion avoidance route included in the congestion avoidance information in the first mode, and adjust the current navigation route to be displayed in the second mode; a time difference acquiring and displaying module, configured to acquire time difference information between estimated time through the congestion avoidance route and the estimated arrival time through the current navigation route, and display, in the navigation map, the time difference information at a set display position associated with the congestion avoidance route; and a second route adjusting module, configured to pop up the prompt widget for switching the navigation route at the set display position of the navigation map, to implement an operation of switching the congestion avoidance route to a new current navigation route according to selection on the prompt widget by a user.

Further, the apparatus for displaying navigation routes provided by this embodiment of the present disclosure may further include: a tag adding module, configured to add a tag of current navigation route at a set display position associated with the current navigation route, and add a tag of congestion avoidance route at a set display position associated with the congestion avoidance route, after the displaying a congestion avoidance route included in the congestion avoidance information in the first mode and adjusting the current navigation route to be displayed in the second mode.

Further, the apparatus for displaying navigation routes provided by this embodiment of the present disclosure may further include: a fourth route displaying module, configured to readjust the current navigation route to be displayed in the first mode if the operation of switching, by the user, the congestion avoidance route to the new current navigation route is not detected within a defined time interval; and a fifth route displaying module, configured to display the congestion avoidance route in the second mode as a backup navigation route.

Further, the apparatus for displaying navigation routes provided by this embodiment of the present disclosure may further include: a backup navigation route planning module, configured to send a route re-planning request to the navigation server if the current position of the user is detected as not being in any one of the current navigation route and the backup navigation routes, wherein the route re-planning request including the current position and the navigation destination; and a sixth route displaying module, configured to receive at least two re-planned navigation routes returned by the navigation server, and display a route having a highest recommendation weight of the re-planned navigation routes in the first mode as a current navigation route, display a remaining route in the second mode as the backup navigation routes.

The apparatus for displaying navigation routes provided by the embodiments of the present disclosure may perform the method for displaying navigation routes provided by any embodiment of the present disclosure, and possess functional modules for performing the method and corresponding beneficial effects. For technical details not described in the embodiments, reference may be made to the method for displaying navigation routes provided by any embodiment of the present disclosure.

The Sixth Embodiment

The sixth embodiment of the present disclosure provides a navigation terminal, which includes the apparatus for displaying navigation routes provided by any embodiment of the present disclosure.

Figure 8:
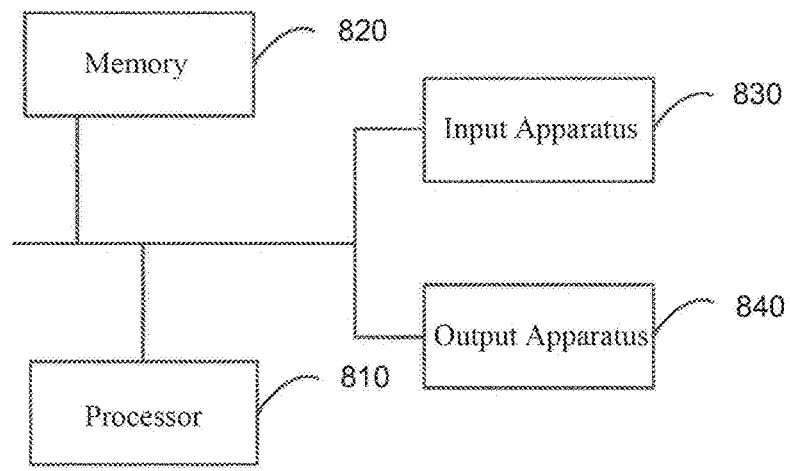
FIG. 8 is a schematic structural diagram of a navigation terminal according to the sixth embodiment of the present disclosure.

Specifically, as shown in FIG. 8, this embodiment of the present disclosure provides a navigation terminal. The navigation terminal includes: a processor 810, a memory 820, an input apparatus 830 and an output apparatus 840. A number of processors 810 in the navigation terminal may be one or more. As shown in FIG. 8, one processor 810 is taken as an example. The processor 810, memory 820, input apparatus 830 and output apparatus 840 in the navigation terminal may be connected via a bus or other manners. FIG. 8 takes the connection via a bus as an example.

As a computer readable storage medium, the memory 820 may be used for storing software programs, computer executable programs and modules, for example, program instructions/modules corresponding to the method for displaying navigation routes in the embodiments of the present disclosure (for example, the navigation route receiving module 701, the navigation route determining module 702 and the first route displaying module 703 in the apparatus for displaying navigation routes). The processor 810 runs the software programs, instructions, and modules stored in the memory 820 to execute various functional applications and data processing of the navigation terminal, so as to implement the method for displaying navigation routes.

The memory 820 may mainly include a program storage area and a data storage area. The program storage area may store an operating system and an application program for at least one function. The data storage area may store data created according to the use of the terminal apparatus, and so on. In addition, the memory 820 may include a high speed random access memory, and may further include a non-transitory memory, for example, at least one magnetic disk storage device, a flash memory device, or other non-transitory solid-state storage devices. In some embodiments, the memory 820 may further include memories disposed remote to the processor 810. These remote memories may be connected to the navigation terminal through a network. Examples of the network include, but not limited to, Internet, an enterprise intranet, a local area network, a mobile communication network, and a combination thereof.

The input apparatus 830 may be used for receiving input digital or character information, and generating key signal inputs related to user settings of the terminal and functional controls. The output apparatus 840 may include a display screen or other display devices.

The embodiments of the present disclosure further provides a storage medium including computer executable instructions, and the computer executable instructions, when executed by the computer processor, perform the method for displaying navigation routes, including:

receiving, from a navigation server, at least two navigation routes from a navigation starting point to a navigation destination;

determining a current navigation route from the navigation routes according to selection by a user, and assigning remaining routes as backup navigation routes; and displaying, in a navigation map, the current navigation route in a first mode and displaying the backup navigation routes in a second mode different from the first mode.

According to the descriptions of the above embodiments, one skilled in the art may clearly understand that the present disclosure may be implemented by means of software and necessary general-purpose hardware, and may be implemented, obviously, by means of hardware. However, the former is a preferred implementation in most cases. Based on such an understanding, the technical solutions of the present disclosure, or the part contributing to the prior art may be essentially embodied in the form of a software product. The computer software product may be stored in a computer readable storage medium, such as a computer floppy disk, a read-only memory (ROM), a random access memory (RAM), a flash, a hard disk, or an optical disk, and includes several instructions for enabling a computer device (which may be a personal computer, a server, a network device, or the like) to execute the method described in each embodiment of the present disclosure.

It should be noted that, in the above embodiments of the apparatus for displaying navigation routes, the referred units and modules are merely divided according to a functional logic, but the present disclosure is not limited to the above division manner, as long as the corresponding functions may be achieved. In addition, the specific names of the functional units are merely used for distinguishing, and are not intended to limit the scope of the present disclosure.

The above descriptions are merely specific embodiments of the present disclosure, and the scope of the present disclosure is not limited thereto. Any changes or replacements that can be easily conceived of by one skilled in the art within the technical scope disclosed by the present disclosure should be covered by the scope of the present disclosure. Therefore, the scope of the present disclosure should be interpreted as the scope sought to be protected by the claims.

What is claimed is:

1. A method for displaying navigation routes, the method comprising:
    receiving, from a navigation server, at least two navigation routes from a navigation starting point to a navigation destination;
    determining a current navigation route from the navigation routes according to selection by a user, and assigning remaining routes as backup navigation routes;
    displaying, in a navigation map, the current navigation route in a first mode and displaying the backup navigation routes in a second mode different from the first mode;
    blanking, in the navigation map, all the backup navigation routes in response to determining that congestion avoidance information sent by the navigation server is received;
    displaying a congestion avoidance route included in the congestion avoidance information in the first mode, and adjusting the current navigation route to be displayed in the second mode;
    acquiring time difference information between estimated time through the congestion avoidance route and an estimated arrival time through the current navigation route, and displaying, in the navigation map, the time difference information at a set display position associated with the congestion avoidance route; and
    popping up a prompt widget for switching the current navigation route at the set display position of the navigation map, to implement an operation of switching the congestion avoidance route to a new current navigation route according to selection on the prompt widget by a user,
    wherein the method is performed by at least one hardware processor.

2. The method according to claim 1, wherein the method further comprises:
    acquiring estimated arrival time to the navigation destination through the current navigation route and the backup navigation routes respectively;
    acquiring time difference information between the estimated arrival time through the backup navigation routes and the estimated arrival time through the current navigation route; and
    displaying, in the navigation map, the time difference information at a set display position associated with the backup navigation routes corresponding to the time difference information.

3. The method according to claim 1, wherein the method further comprises:
    in response to detecting selection of a target backup navigation route by a user, adjusting in the navigation map the target backup navigation route to be displayed in the first mode and the current navigation route to be displayed in the second mode; and
    popping up a prompt widget for switching the navigation routes at a set display position of the navigation map, to implement an operation of switching the target backup navigation route to a new current navigation route according to selection on the prompt widget by a user.

4. The method according to claim 3, wherein, after the adjusting in the navigation map the target backup navigation route to be displayed in the first mode and the current navigation route to be displayed in the second mode, the method further comprises:
    acquiring time difference information between the estimated time through the current navigation route displayed in the second mode and the estimated time through the target backup navigation route; and
    displaying, in the navigation map, the time difference information at a set display position associated with the current navigation route that is displayed in the second mode and corresponds to the time difference information.

5. The method according to claim 3, wherein a time difference information is displayed in the navigation map in a form of a time tag, and
    the detecting selection of a target backup navigation route by a user accordingly comprises: detecting selection of the backup navigation route by a user from the navigation routes, or detecting selection of one of the time tags of the backup navigation routes by a user.

6. The method according to claim 1, wherein the method further comprises:
    in the course of route navigation, in response to determining that a current position of a user deviates from the backup navigation route, blanking the deviated backup navigation route in the navigation map.

7. The method according to claim 6, wherein the method further comprises:
    in the course of route navigation, in response to determining that a number of the currently displayed backup navigation routes being less than one, acquiring at least one backup navigation route different from the current navigation route according to the current position of the user and the navigation destination, and displaying the acquired backup navigation routes in the second mode.

8. A non-transitory computer storage medium storing a computer program, the computer program when executed by one or more processors, causes the one or more processors to perform operations, the operations comprising:

receiving, from a navigation server, at least two navigation routes from a navigation starting point to a navigation destination;

determining a current navigation route from the navigation routes according to selection by a user, and assigning remaining routes as backup navigation routes;

displaying, in a navigation map, the current navigation route in a first mode and displaying the backup navigation routes in a second mode different from the first mode;

blanking, in the navigation map, all the backup navigation routes in response to determining that congestion avoidance information sent by the navigation server is received;

displaying a congestion avoidance route included in the congestion avoidance information in the first mode, and adjusting the current navigation route to be displayed in the second mode;

acquiring time difference information between estimated time through the congestion avoidance route and an estimated arrival time through the current navigation route, and displaying, in the navigation map, the time difference information at a set display position associated with the congestion avoidance route; and popping up a prompt widget for switching the current navigation route at the set display position of the navigation map, to implement an operation of switching the congestion avoidance route to a new current navigation route according to selection on the prompt widget by a user.

9. The method according to claim 1, wherein, after the displaying a congestion avoidance route included in the congestion avoidance information in the first mode and adjusting the current navigation route to be displayed in the second mode, the method further comprises:

adding a tag of current navigation route at a set display position associated with the current navigation route, and adding a tag of congestion avoidance route at a set display position associated with the congestion avoidance route.

10. The method according to claim 1, wherein the method further comprises:

in response to determining the operation of switching, by the user, the congestion avoidance route to the new current navigation route is not detected within a defined time interval, readjusting the current navigation route to be displayed in the first mode; and displaying the congestion avoidance route in the second mode as a backup navigation route.

11. The method according to claim 1, wherein the method further comprises:

sending a route re-planning request to the navigation server in response to determining that a current position of the user is detected as not being in any one of the current navigation route and the backup navigation routes, wherein the route re-planning request including the current position and the navigation destination; and receiving at least two re-planned navigation routes returned by the navigation server, and displaying a route having a highest recommendation weight of the re-planned navigation routes in the first mode as a current navigation route, displaying a remaining route in the second mode as the backup navigation routes.

12. An apparatus for displaying navigation routes, the apparatus comprising:

at least one processor; and a memory storing instructions, the instructions when executed by the at least one processor, cause the at least one processor to perform operations, the operations comprising:

receiving, from a navigation server, at least two navigation routes from a navigation starting point to a navigation destination;

determining a current navigation route from the navigation routes according to selection by a user, and assigning remaining routes as backup navigation routes;

displaying, in a navigation map, the current navigation route in a first mode and displaying the backup navigation routes in a second mode different from the first mode;

blanking, in the navigation map, all the backup navigation routes in response to determining that congestion avoidance information sent by the navigation server is received;

displaying a congestion avoidance route included in the congestion avoidance information in the first mode, and adjusting the current navigation route to be displayed in the second mode;

acquiring time difference information between estimated time through the congestion avoidance route and an estimated arrival time through the current navigation route, and displaying, in the navigation map, the time difference information at a set display position associated with the congestion avoidance route; and popping up a prompt widget for switching the current navigation route at the set display position of the navigation map, to implement an operation of switching the congestion avoidance route to a new current navigation route according to selection on the prompt widget by a user.

13. The apparatus according to claim 12, wherein the operations further comprise:

acquiring estimated arrival time to the navigation destination through the current navigation route and the backup navigation routes respectively;

acquiring time difference information between the estimated arrival time through the backup navigation routes and the estimated arrival time through the current navigation route; and displaying, in the navigation map, the time difference information at a set display position associated with the backup navigation routes corresponding to the time difference information.

14. The apparatus according to claim 12, wherein the operations further comprise:

in response to detecting selection of a target backup navigation route by a user, adjusting in the navigation map the target backup navigation route to be displayed in the first mode and the current navigation route to be displayed in the second mode; and popping up a prompt widget for switching the navigation routes at a set display position of the navigation map, to implement an operation of switching the target backup navigation route to a new current navigation route according to selection on the prompt widget by a user.

15. The apparatus according to claim 14, wherein, after the adjusting in the navigation map the target backup navigation route to be displayed in the first mode and the current navigation route to be displayed in the second mode, the operations further comprise:

acquiring time difference information between the estimated time through the current navigation route displayed in the second mode and the estimated time through the target backup navigation route; and displaying, in the navigation map, the time difference information at a set display position associated with the current navigation route that is displayed in the second mode and corresponds to the time difference information.

\* \* \* \* \*